United States Patent
Yang et al.

(10) Patent No.: US 9,674,816 B2
(45) Date of Patent: Jun. 6, 2017

(54) NODE AND METHOD FOR PRIORITY OF APPLICATION BASED HANDLING OF A PAGING REQUEST

(71) Applicant: TELEFONAKTIEBOLAGET L M ERICSSON (PUBL), Stockholm (SE)

(72) Inventors: Yong Yang, Mölndal (SE); Zu Qiang, Kirkland (CA); Hans Rönneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 216 days.

(21) Appl. No.: 14/560,706

(22) Filed: Dec. 4, 2014

(65) Prior Publication Data
US 2015/0085752 A1    Mar. 26, 2015

Related U.S. Application Data

(62) Division of application No. 13/742,398, filed on Jan. 16, 2013, now Pat. No. 9,351,274.

(60) Provisional application No. 61/674,865, filed on Jul. 24, 2012.

(30) Foreign Application Priority Data

Jan. 16, 2013   (WO) ................ PCT/EP2013/050714

(51) Int. Cl.
*H04W 68/00* (2009.01)
*H04W 72/04* (2009.01)
*H04W 68/02* (2009.01)

(52) U.S. Cl.
CPC .......... *H04W 68/00* (2013.01); *H04W 68/02* (2013.01); *H04W 72/042* (2013.01)

(58) Field of Classification Search
CPC ........................... H04W 72/042; H04W 68/02
See application file for complete search history.

(56) References Cited

U.S. PATENT DOCUMENTS

| | | |
|---|---|---|
| 2008/0025250 A1 | 1/2008 | Wang et al. |
| 2010/0208624 A1 | 8/2010 | Vikberg et al. |
| 2011/0286465 A1* | 11/2011 | Koodli .................. H04W 68/00 370/401 |
| 2011/0310804 A1* | 12/2011 | Beygzadeh ........... H04W 68/00 370/328 |

(Continued)

FOREIGN PATENT DOCUMENTS

RU    2450490 C1    5/2012

OTHER PUBLICATIONS

International Search Report of the International Searching Authority dated Jun. 28, 2013, in International Application No. PCT/EP2013/050714, 6 pages.

(Continued)

*Primary Examiner* — Redentor Pasia
(74) *Attorney, Agent, or Firm* — Rothwell, Figg, Ernst & Manbeck, P.C.

(57) ABSTRACT

Example embodiments presented herein are directed towards a device, mobility management node and/or a serving gateway, and corresponding methods there, for providing application, service or priority based paging. According to some of the example embodiments, the decision whether or not to issue or accept a paging request may be made based on a priority, application or service (or type of service) associated with the paging request.

8 Claims, 9 Drawing Sheets

(56) References Cited

U.S. PATENT DOCUMENTS

| | | | |
|---|---|---|---|
| 2012/0087313 A1* | 4/2012 | Yin | H04W 48/16 370/328 |
| 2012/0093086 A1* | 4/2012 | Yin | H04L 69/16 370/328 |
| 2012/0270574 A1* | 10/2012 | Nishida | H04W 68/02 455/458 |
| 2013/0170438 A1* | 7/2013 | Nishida | H04W 68/005 370/328 |
| 2016/0360534 A1 | 12/2016 | Kanazawa et al. | |

OTHER PUBLICATIONS

Russian Office Action issued in Application No. 2015105956 dated Jan. 30, 2017,.

* cited by examiner

US 9,674,816 B2

NODE AND METHOD FOR PRIORITY OF APPLICATION BASED HANDLING OF A PAGING REQUEST

RELATED APPLICATIONS

This application is a divisional of U.S. application Ser. No. 13/742,398, filed Jan. 16, 2013, now U.S. Pat. No. 9,351,274, which claims the benefit of U.S. Provisional Application No. 61/674,865, filed on Jul. 24, 2012 and International Application No. PCT/EP2013/050714 filed on Jan. 16, 2013. The contents of each of the referenced applications are incorporated herein by reference in their entirety.

BACKGROUND

In a typical cellular system, also referred to as a wireless communications network, wireless terminals, also known as mobile stations and/or user equipment units communicate via a Radio Access Network (RAN) to one or more core networks. The wireless terminals can be devices, mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

SUMMARY

During operation, a device or user equipment may go idle after a period of non-activity. If an application server wishes to send data to an idle device or user equipment, the device or user equipment is typically paged. In most current systems, a page request is sent to the device or user equipment regardless of any demands or overloading effects that may be occurring in the wireless network. Thus, at least one example object of the example embodiments presented herein is provide improved paging methods where an informed decision of whether or not to issue or accept a paging request may be taken.

An example advantage of some of the example embodiments may comprise a reduction in idle to active transitions in certain conditions (e.g., during a paging overload, S11 signaling overload, etc.). Another example advantage is the reduction of used signal and network resources. Furthermore, the example embodiments presented herein provide a solution for Core Network overloading. Other example advantages comprise providing the device or user equipment and network full flexibility to handle mobility/session management procedures on a per application basis.

Thus, some example embodiments are directed towards a method, in a device or user equipment, for priority, service or application based handling of a paging request. The device or user equipment is comprised in a wireless communications network. The method comprises receiving, from a MME or S4-SGSN, a paging request. The paging request comprises information related to a priority, service or application. The method also comprises determining a priority level, a service, type of service or application associated to the information. The method further comprises making a decision to accept or ignore the paging request based on the priority level, a service, type of service or application associated with the information.

Some example embodiments are directed towards a device or user equipment for priority, service or application based handling of a paging request. The device or user equipment is comprised in a wireless communications network. The device or user equipment comprises radio circuitry configured to receive, from a MME or S4-SGSN, a paging request, the paging request comprising information related to a priority, service or application. The device or user equipment also comprises processing circuitry configured to determine a priority level, service, type of service or application associated to the information. The processing circuitry is further configured to make a decision to accept or ignore the paging request based on the priority level, a service, type of service or application associated with the information.

Some example embodiments are directed towards a method, in an MME or S4-SGSN, for priority, service or application based paging. The MME or S4-SGSN is comprised in a wireless communications network. The method comprises receiving, from a SGW, a downlink data notification, where the downlink data notification comprising an SCI. The method further comprises determining a paging algorithm or method based on the SCI. The method also comprises sending, to a device or user equipment, a paging request comprising information related to a priority, service or application derived from the SCI.

Some example embodiments are directed towards a MME or S4-SGSN for priority, service or application based paging. The MME or S4-SGSN is comprised in a wireless communications network. The MME or S4-SGSN comprises radio circuitry configured to receive, from a SGW, a downlink data notification, where the downlink data notification comprising an SCI. The MME or S4-SGSN also comprises processing circuitry configured to determine a paging algorithm or method based on the SCI. The radio circuitry is further configured to send, to a device or user equipment, a paging request comprising information related to a priority, service or application derived from the SCI.

Some of the example embodiments are directed towards a method, in a SGW, for handling priority, service or application based paging. The SGW is comprised in a wireless communications network. The method comprises receiving, from a PGW, a user plane packet comprising a SCI. The method further comprises extracting the SCI from a user plane packet if there is no downlink user path established for a concerning device or user equipment. The method also comprises sending, to a MME or S4-SGSN, a downlink data notification on a control plane, wherein the downlink data notification comprises the SCI or reference to the SCI (based on a VPLMN configuration).

Some example embodiments are directed towards a SGW for handling priority, service or application based paging. The SGW is comprised in a wireless communications network. The SGW comprises radio circuitry configured to receive, from a PGW, a user plane packet comprising a SCI. The SGW also comprises processing circuitry configured to extract the SCI if there is no downlink user path established for a concerning device or user equipment. The radio circuitry is further configured to send, to a MME or S4-SGSN, a downlink data notification on a control plane, wherein the downlink data notification comprises the SCI or reference to the SCI (based on a VPLMN configuration).

DEFINITIONS

3GPP 3rd Generation Partnership Project
ADC Application Detection Control
BSC Base Station Controller
DDN Downlink Data Notification
EPC Evolved Packet Core
E-UTRAN Evolved UTRAN
F-TEID Fully Qualified Tunnel End Point Identifier
GERAN GSM/EDGE Radio Access Network
GPRS General Packet Radio Service
GSM Global System for Mobile communications
GTP GPRS Tunneling Protocol
GTP-U GTP-User plane
GUTI Globally Unique Temporary Identity
HLR Home Location Register
HSS Home Subscriber Server
IMSI International Mobile Subscriber Identity
LTE Long-Term Evolution
MME Mobility Management Entity
NAS Non-Access Stratum
PDN Packet Data Network
PGW PDN Gateway
P-TMSI Packet Temporary Mobile Subscriber Identity
RAN Radio Access Network
RAU Routing Area Update
RBS Radio Base Station
RF Radio Frequency
RNC Radio Network Controller
SCI Service Class Indicator
SGSN Serving GPRS Support Node
SGW Serving Gateway
TAU Tracking Area Update
TMSI Temporary Mobile Subscriber Identity
UE User Equipment
UMTS Universal Mobile Telecommunications System
UTRAN Universal Terrestrial Radio Access Network
VPLMN Visited Public Land Mobile Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
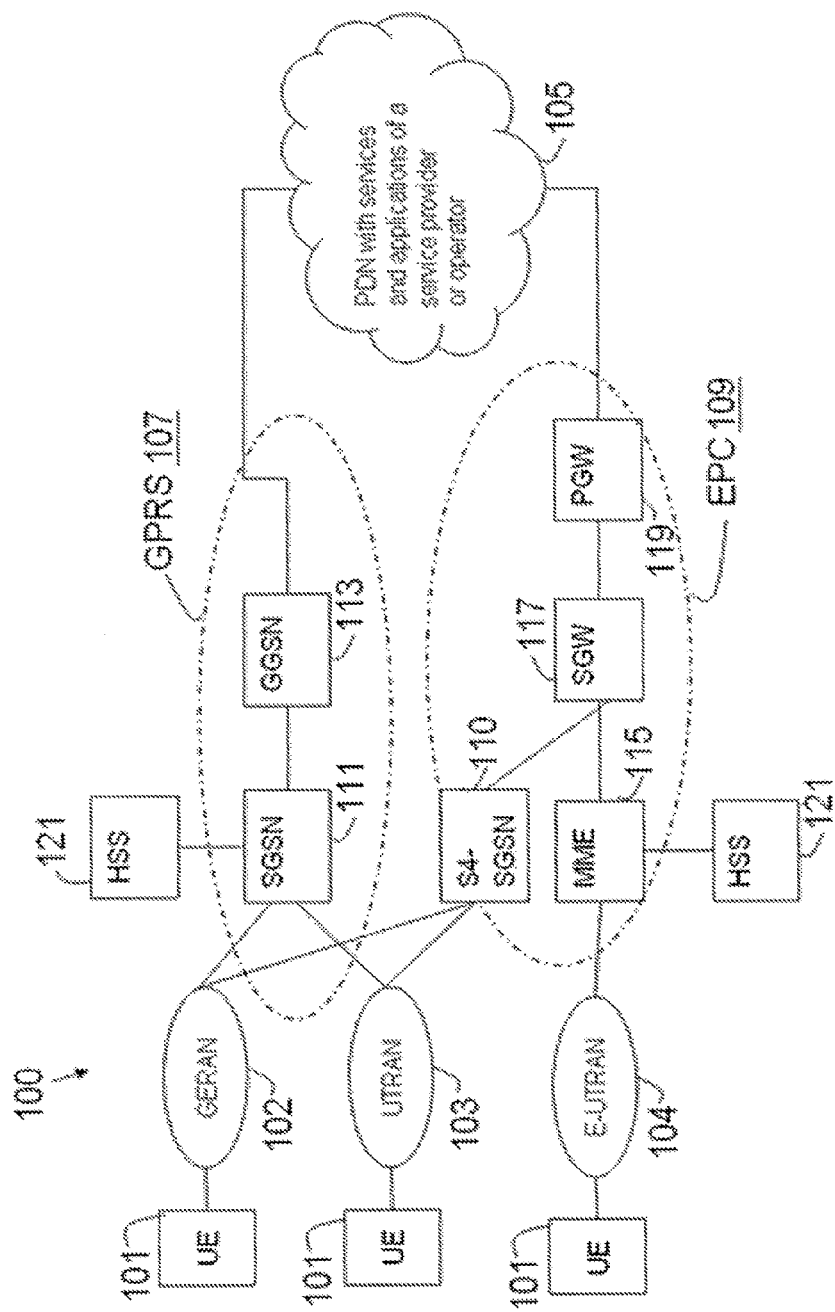
FIG. 1 is an example illustration of a wireless network.

In order to provide a better explanation of the example embodiments presented herein, a problem will first be identified and discussed. FIG. 1 provides an example of a communication network 100. As shown in FIG. 1, a device or user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the device or user equipment 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

During operation, the device or user equipment 101 may become idle after a period of non-activity. While the device or user equipment is idle the application server 105 may need to send data to the device or user equipment 101. In order for the device or user equipment 101 to receive the data, it must transition to an active state. Such a transition is typically triggered by a paging process or request. Currently, most systems do not provide a means for deciding whether or not to accept or issue a paging request. Currently, such a paging request will be issued automatically, regardless or any possible system overloads that may be occurring. Thus, a need exists for providing improved paging procedures.

According to some of the example embodiments, priority, service, service type or application based handling of paging request may be provided. Thru such paging, a network node may decide whether or not to issue or accept a paging message depending on a priority, service (or type of service) or application associated with the paging message. Thus, according to some of the example embodiments, an indicator may be comprised in the paging message (or any other communication message) to identify the service, priority or application associated with the paging.

According to some of the example embodiments, such priority, service, service type or application based handling may be provided with the use of a Service Class Indicator (SCI). A SCI may be used to identify a type of service, priority or application associated with the paging request. Therefore, the SCI may be used in the handling of the paging procedure with respect to an identified priority, service, type of service or application.

The SCI may be provided to a SGW when the SGW receives user plane packets or messages, for example GTP-U packets or messages, with a SCI comprised. Such messages or packets may be sent when the device or user equipment is the idle state, for example, without a user plane established for the device or user equipment, or when the SGW by other means decides that a specific service class shall be used.

According to some of the example embodiments, when the SGW receives a GTP-U packet with the SCI for an idle device or user equipment, the SGW may send a Downlink Data Notification with the SCI or reference to the SCI (based on a VPLMN configuration) to the MME or S4-SGSN. According to some of the example embodiments, when a Downlink Data Notification request message with SCI is received, the MME or S4-SGSN may decide to page the device or user equipment or respond to the SGW with a Downlink Data Notification Acknowledge or a Downlink Data Notification failure Indication message. If a decision is made not to send the paging message, the Downlink Data Notification Acknowledge or the Downlink Data Notification failure Indication message may comprise a cause code which indicates the reason of the rejection. For instance, the cause code may be associated with network congestion control.

According to some of the example embodiments, if a decision is made to issue a paging request, the MME or S4-SGSSN may provide an indication of the service, type of service, priority or application associated with the page request to the device or user equipment. The MME or the S4-SGSN (e.g., mobility management node), has knowledge of which application, priority, service or type of service (e.g., characteristics of service) has caused the trigger for the MME or S4-SGSN to send the paging request. Such knowledge may be derived from an External Identifier provided by the device or user equipment during attach and session management procedures.

For example, the device or user equipment may inform the network which applications or services are activated explicitly, or the network may obtain such information based on subscription information stored in a database. An example of such a database may be found in the HSS or the HLR where information such as subscribed applications or services may be sent from the HSS or HLR to the MME or S4-SGSN, or by some other means, for example, received from upstream network entities such as the SGW of the PGW.

According to some of the example embodiments, it should be appreciated that the SCI may also be provided in the paging request. Such SCIs may be comprised in the paging message sent from the MME or the S4-SGSN to RAN, for example, UTRAN (using RANAP), E-UTRAN (using S1AP) and GERAN (using BSSGP).

According to some of the example embodiments, the various nodes of the network may be configured to provide their respective capability for the application or service based paging. According to some of the example embodiments, the SGW may be configured to know if the PGW supports the inclusion of SCI. It should also be appreciated that the SGW may be informed of the PGW's support for the inclusion with the use of PDN connection related signalling. If PDN connection related signalling is utilized, a new indication sent by the PGW during PDN connection related signalling between the SGW and the PGW may be used. The new indication may be comprised in a create session response message or a modify bearer response message.

According to some of the example embodiments, a new capability indication sent from the MME or S4-SGSN may be used to indicate that the MME or S4-SGSN supports paging with respect to an application or service. This indicator may reduce the processing load in the SGW. Such an indication may be comprised in an existing GTP message from the MME or S4-SGSN to the SGW. Non-limiting examples existing GTP messages which may provide the indication are a create session request or an echo request message. It should be appreciated that such messages may utilize a supported notification feature as described in 3GPP TS 29.274.

Figure 2:
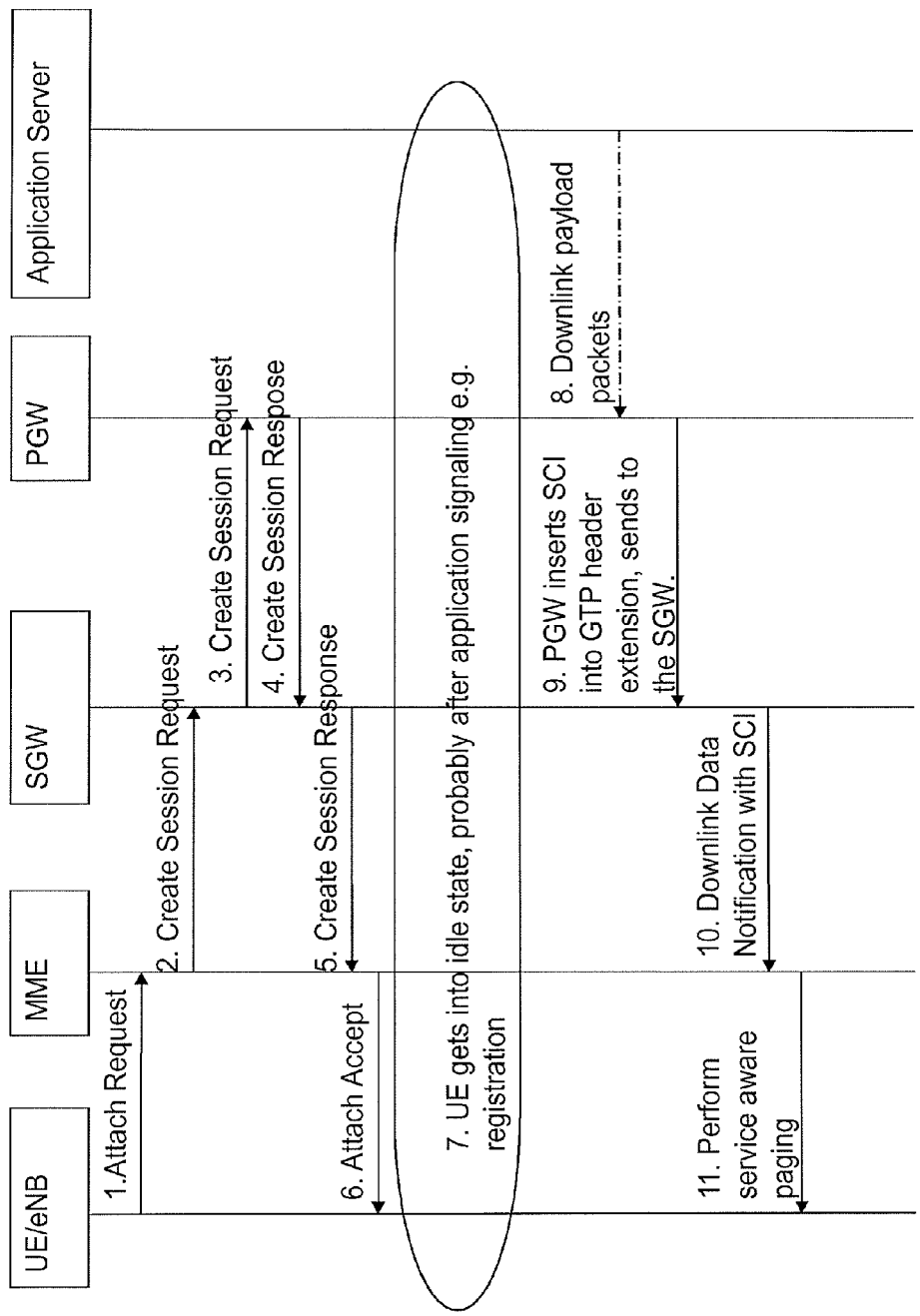
FIGS. 2 and 3 are a message sequence diagrams depicting a non-limiting examples of some of the example embodiments presented herein.

FIG. 2 illustrates a message passing diagram of an E-UTRAN initial attach and network initiated service request depicting some of the example embodiments discussed herein. First, a device or user equipment or an eNodeB may send an attach request message to a MME or S4-SGSN (message 1). According to some of the example embodiments, the attach message may also comprise a support indicator to let the MME or S4-SGSN know that the device or user equipment supports priority or application based paging, and/or that the device or user equipment supports the use of multiple TMSIs (e.g., TMSI per application/service).

Therefore, when the MME or S4-SGSN allocates GUTI or P-TMSI for the device or user equipment, a group of GUTI or P-TMSI may be allocated to the device or user equipment. The allocation may be performed in the way that GUTI or P-TMSI is allocated, for example, in a net mask or prefix fashion. For example, M-TMSI has 32 bits, however, a MME or S4-SGSN may allocate only 28 bits which leaves 4 bits for the identification of a priority, application, service or type of service.

Upon receiving the message, the MME or S4-SGSN may send an update location request message to the HSS to retrieve device or user equipment subscription information (not shown). The HSS may in return provide subscribed applications data in the update location acknowledgement message (not shown).

Thereafter, the MME or S4-SGSN may send a create session request message to the SGW (message 2). According to some of the example embodiments, the message may comprise an indicator or information element notifying the SGW that the MME or S4-SGSN supports the handling or paging based on SCI information (or any other indicator of a priority, application, service or type of service). The SGW may forward the create session request message to the PGW (message 3). The PGW may in return send a create session response to the SGW (message 4). According to some of the example embodiments, the create session response may comprise an indicator or information element notifying the SGW that SCI (or any other form of indication) will be comprised in GTP-U packets for the PDN connection associated with the request. The SGW may forward the create session response to the MME or S4-SGSN (message 5).

The MME or S4-SGSN accepts the attach request by sending an attach accept message to the device or user equipment or eNodeB (message 6). Upon acceptance of the attach request, the device or user equipment performs payload transferring (message 7). Examples of such payload transferring may be performing registration of certain applications. Upon performing payload transferring, the application server will know the IP address of the device or user equipment. Thereafter, the device or user equipment may at some point enter an idle state.

The application server may send downlink payload data on the user plane to the PGW (message 8). The PGW will forward the payload data with the associated SCI to the SGW in, for example, a GTP-U extension header (message 9). According to some of the example embodiments, the SGW then creates a downlink data notification message if the device or user equipment is in an idle state or if the SGW does not have a downlink F-TEID (downlink IP address and GPRS Tunnel Endpoint Identifier) (message 10). According to some of the example embodiments, if the MME or S4-SGSN supports SCI based paging, the SGW may further include the SCI, or a reference to the SCI (based on a VPLMN configuration) in the downlink data notification message.

When the MME or S4-SGSN receives the downlink data notification message with the SCI, the MME or S4-SGSN may decide to page the device or user equipment (message 11). In sending the paging message, the MME or S4-SGSN may translate the SCI in the downlink data notification message to a page notification using a mapping table. Thus, the MME or S4-SGSN may include the SCI in a S1AP paging message sent to the eNodeB to perform application aware paging.

Alternatively, the MME or S4-SGSN may response to the SGW with a downlink data notification acknowledgement/downlink data notification failure indication (not shown), which comprises a cause code of the rejection reason, for example, "rejected due to network congestion control". Optionally, the MME or S4-SGSN may send a back-off timer in the downlink data notification acknowledgement/downlink data notification failure indication message, which indicates that before the timer expired the SGW shall not initiate any downlink data notifications on the same PDN connection or on any PDN connections with the same or lower SCI on the MME or S4-SGSN.

It should be appreciated that the MME or S4-SGSN has a mapping function which translates the SCI to a service indication in the paging. This mapping function may be device or user equipment specific. The mapping table may be created or updated when the device or user equipment registers the SCI's it is using, for example, at attach or inter-SGSN-RAU/inter-MME-TAU. It should be appreciated that the mapping may be a dynamic mapping between an external identifier and applications, priority, services or type of services in the subscription database. The dynamic mapping may also be the result of an earlier report of an indication number from a device or user equipment, for example, via NAS signalling.

It should further be appreciated that the indication provided to the device or user equipment may be in the form of an applications or services number. On example of such an application or services number may be an index of an application or service which may be stored in a subscription database in, for example, a HSS or HLR. For example, an index of 1 may correspond to the first application in the device or user equipment's subscriber profile. Another example of an indicator may be a number statically configured in the device or user equipment or reported by the device or user equipment via NAS signalling.

According to some of the example embodiments, when a group of GUTI or P-TMSI is used by the MME or S4-SGSN and the device or user equipment, the rest of the GUTI or P-TMSI may be used for identifying a corresponding application, priority, service or type of service used by the device or user equipment. Thus, when a page is sent to the device or user equipment, the MME or S4-SGSN may use the respective TMSI to page the device or user equipment, thereby identifying the application, priority, service or type of service.

It should also be appreciated that if the device or user equipment is registered with the application server directly, an application identifier may be assigned by the mobile network. It should also be appreciated that such an application identifier may already be available via an Application Detection Control (ADC) rule.

Figure 3:
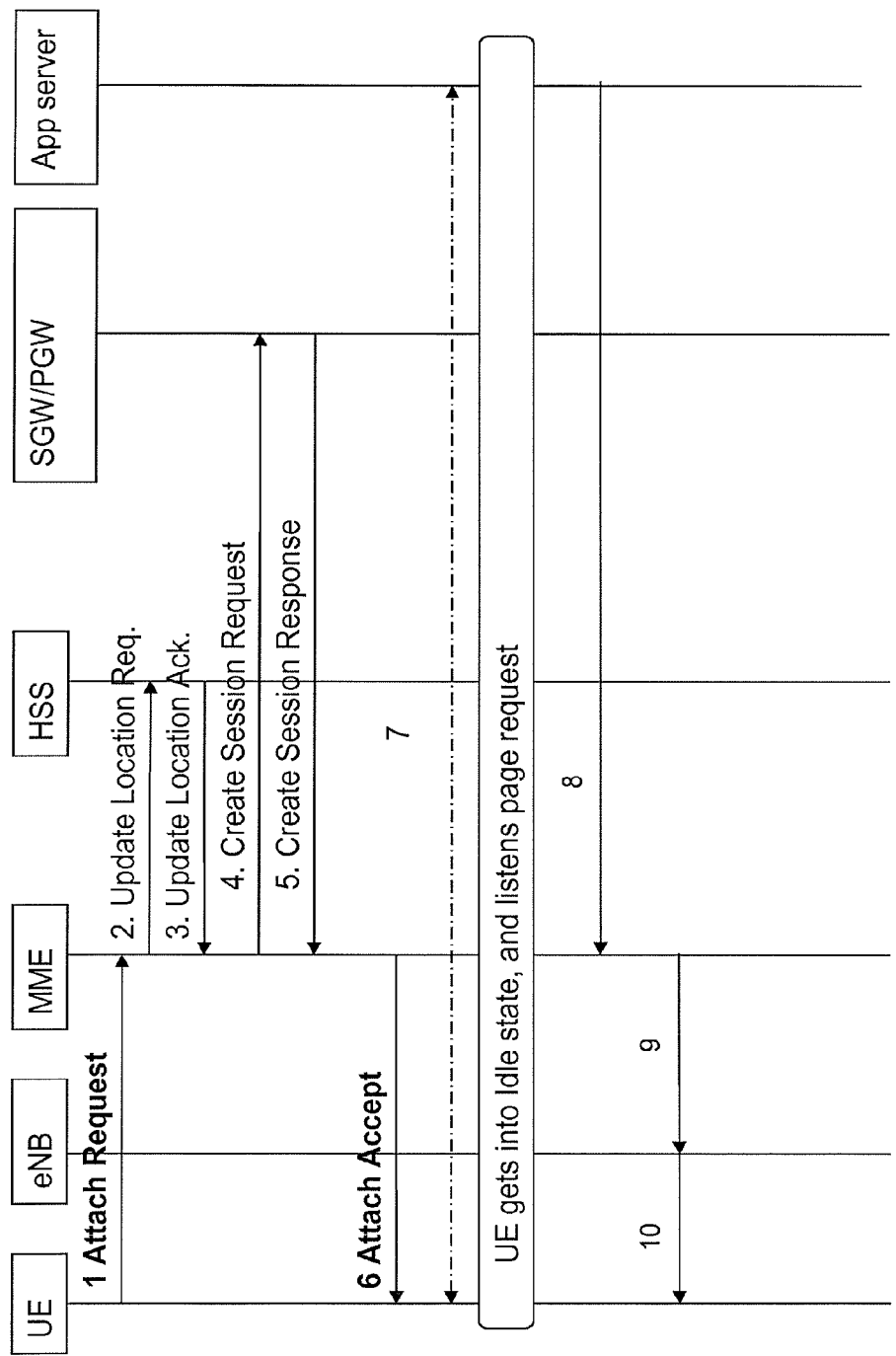

FIG. 3 illustrates another example messaging diagram according to some of the example embodiments presented herein. FIG. 3 illustrates an E-UTRAN initiate attach procedure. The procedure is simplified for the purpose of explaining the example embodiments. The dotted line in FIG. 3 represents user plane signalling.

First, the device or user equipment may send an attach request message to the MME (message 1). The attach request message may comprise a new information element which indicates to the MME if the device or user equipment supports multiple TMSIs, for example, a TMSI per application or service. Upon receiving the attach request message, the MME may send an update location request message to the HSS to retrieve subscription information for the requesting device or user equipment (message 2). The HSS may in return supply the subscription information to the MME in a update location acknowledgement message (message 3).

The MME may thereafter send a create session request message to the SGW/PGW to establish the PDN connection (message 4). The SGW/PGW may also send a message acknowledging the request (message 5). The MME then accepts the attach request by sending an attach accept message to the device or user equipment (message 6). The attach accept message may comprise a new information element which may be utilized to indicate the length of the GUTI prefix.

The device or user equipment performs some payload transferring. At some point later, the device or user equipment may enter into an idle state. After the device or user equipment enters idle mode, the application server may notify the MME about a downlink triggering request (message 8). The downlink triggering request may prompt the MME to send a paging message to the device or user equipment. In sending a page to the device or user equipment, the MME may first send a paging message to the eNB or base station (message 9). The base station may thereafter forward the page to the device or user equipment (message 10). The page message may comprise a specific TMSI corresponding to the application, priority, service or type of service triggering the page request.

Figure 4:
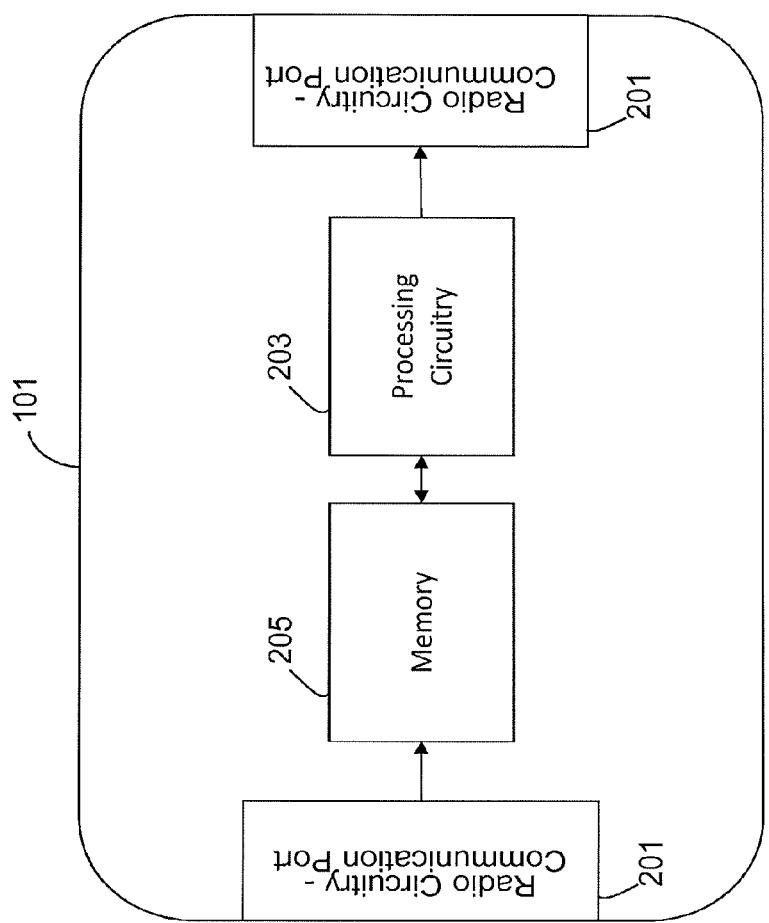
FIG. 4 is an example node configuration of a device or user equipment, according to some of the example embodiments.

FIG. 4 illustrates an example node configuration of a device or user equipment 101 which may perform some of the example embodiments described herein. The device or user equipment 101 may comprise radio circuitry or a communication port 201 that may be configured to receive and/or transmit communication data, instructions, and/or messages. It should be appreciated that the radio circuitry or communication port 201 may be comprised as any number of transceiving, receiving, and/or transmitting units or circuitry. It should further be appreciated that the radio circuitry or communication 201 may be in the form of any input or output communications port known in the art. The radio circuitry or communication 201 may comprise RF circuitry and baseband processing circuitry (not shown).

The device or user equipment 101 may also comprise a processing unit or circuitry 203 which may be configured to monitor an identified application and detect a usage of the identified application. The processing circuitry 203 may be any suitable type of computation unit, e.g. a microprocessor, digital signal processor (DSP), field programmable gate array (FPGA), or application specific integrated circuit (ASIC), or any other form of circuitry. The device or user equipment 101 may further comprise a memory unit or circuitry 205 which may be any suitable type of computer readable memory and may be of volatile and/or non-volatile type. The memory 205 may be configured to store received, transmitted, and/or measured data, device parameters, communication priorities, and/or executable program instructions.

Figure 5:
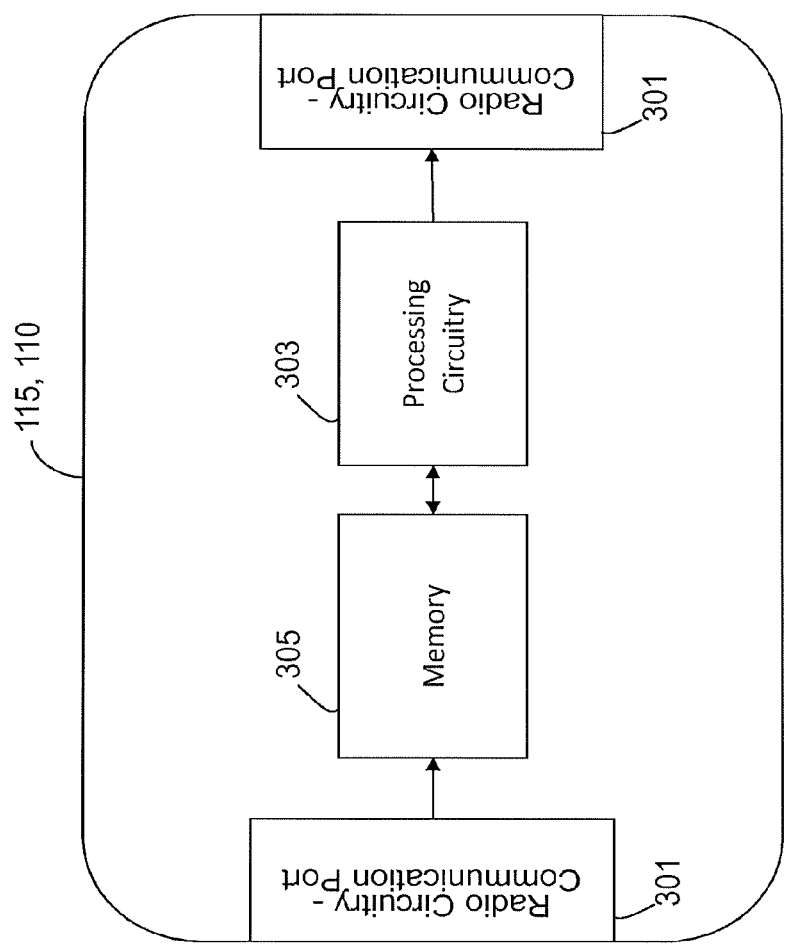
FIG. 5 is an example node configuration of a MME or S4-SGSN, according to some of the example embodiments.

FIG. 5 illustrates an example node configuration of a MME 115 or S4-SGSN 110 which may perform some of the example embodiments described herein. The MME 115 or S4-SGSN 110 may comprise radio circuitry or a communication port 301 that may be configured to receive and/or transmit communication data, instructions, and/or messages. It should be appreciated that the radio circuitry or communication port 301 may be comprised as any number of transceiving, receiving, and/or transmitting units or circuitry. It should further be appreciated that the radio circuitry or communication 301 may be in the form of any input/output communications port known in the art. The radio circuitry or communication 301 may comprise RF circuitry and baseband processing circuitry (not shown).

The MME 115 or S4-SGSN 110 may also comprise a processing unit or circuitry 303 which may be configured to monitor an identified application and detect a usage of the identified application. The processing circuitry 303 may be any suitable type of computation unit, e.g. a microprocessor, digital signal processor (DSP), field programmable gate array (FPGA), or application specific integrated circuit (ASIC), or any other form of circuitry. The MME 115 or S4-SGSN 110 may further comprise a memory unit or circuitry 305 which may be any suitable type of computer readable memory and may be of volatile and/or non-volatile type. The memory 305 may be configured to store received, transmitted, and/or measured data, device parameters, communication priorities, and/or executable program instructions.

Figure 6:
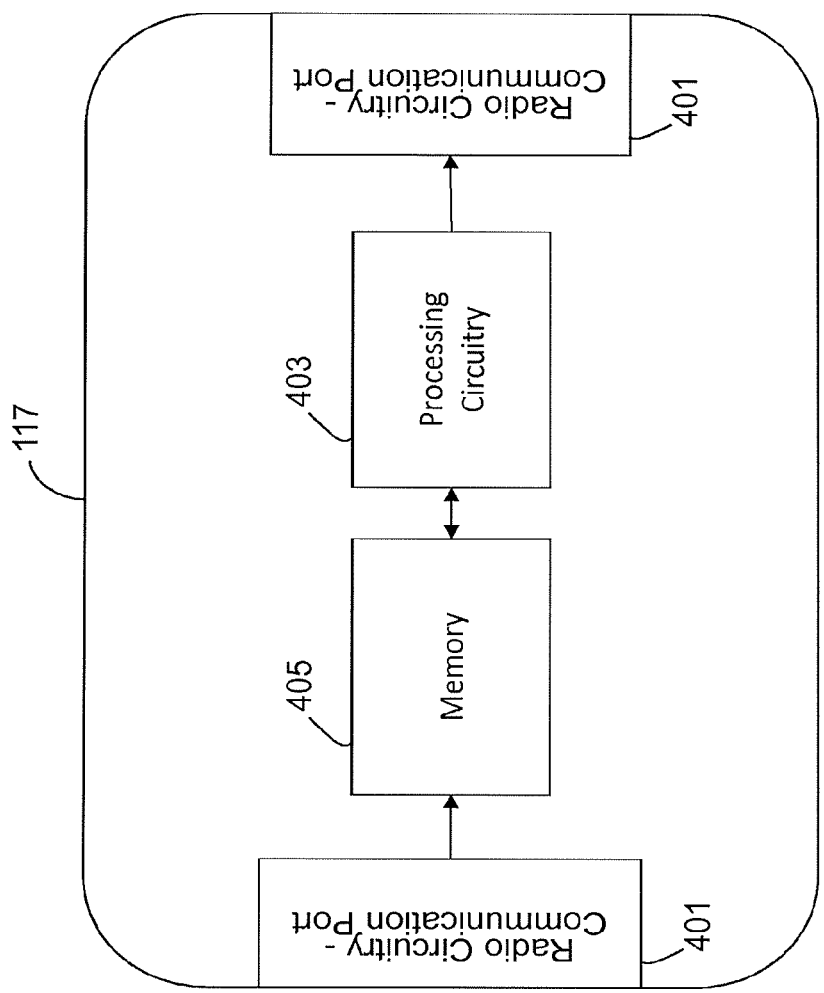
FIG. 6 is an example node configuration of a SGW, according to some of the example embodiments.

FIG. 6 illustrates an example node configuration of a SGW 117 which may perform some of the example embodiments described herein. The SGW 117 may comprise radio circuitry or a communication port 401 that may be configured to receive and/or transmit communication data, instructions, and/or messages. It should be appreciated that the radio circuitry or communication port 401 may be comprised as any number of transceiving, receiving, and/or transmitting units or circuitry. It should further be appreciated that the radio circuitry or communication 401 may be in the form of any input/output communications port known in the art. The radio circuitry or communication 401 may comprise RF circuitry and baseband processing circuitry (not shown).

The SGW 117 may also comprise a processing unit or circuitry 403 which may be configured to monitor an identified application and detect a usage of the identified application. The processing circuitry 403 may be any suitable type of computation unit, e.g. a microprocessor, digital signal processor (DSP), field programmable gate array (FPGA), or application specific integrated circuit (ASIC), or any other form of circuitry. The SGW 117 may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Figure 7:
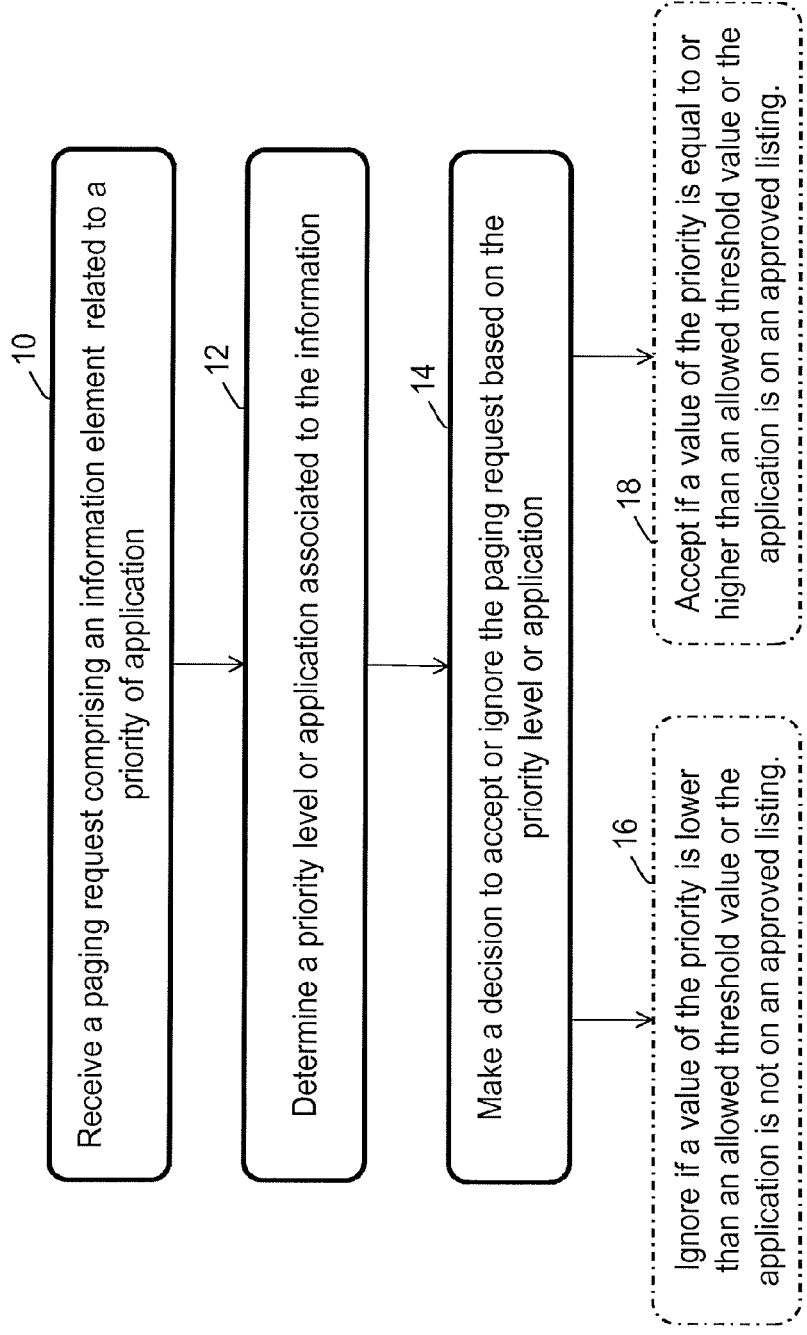
FIG. 7 is a flow diagram depicting example operations which may be taken by the device or user equipment of FIG. 4, according to some of the example embodiments.

FIG. 7 is a flow diagram depicting example operations which may be taken by the device or user equipment 101 of FIG. 4 for priority, service or application based handling of a paging request. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The device or user equipment 101 is configured to receive 10, from a MME or S4-SGSN, a paging request. The paging request comprises information related to a priority, service or application. The radio circuitry 201 is configured to receive, from the MME or S4-SGSN, the paging request.

According to some of the example embodiments, the information may comprise a specific TMSI used for paging which may be mapped to a priority, service or application identifier. According to some of the example embodiments the information may comprise a new information element which may directly comprise the priority, service (or type of service) or application identifier. According to some of the example embodiments, the priority level, service or application associated with the information may be determined from evaluating the specific TMSI or the priority, service or application identifier which may be comprised in, or as a part of, the information.

According to some of the example embodiments, the specific TMSI is allocated by the MME or S4-SGSN using net masking or prefix fashion, i.e., multiple TMSIs may be allocated and each TMSI may correspond to a specific priority, service or application during a GUTI/P-TMSI allocation procedure, e.g., within an E-UTRAN Initial Attach procedure.

According to some of the example embodiments the information related to the priority, service or application is received via a S4/S11 interface by the MME or S4-SGSN. According to some of the example embodiments the information related to the priority, service or application is carried in a SCI which is part of a user plane packet, e.g., a GTP-U extension header.

According to some of the example embodiments, the information related to the priority, service or application may be in the form of an applications or services number. It should be appreciated that such a number may be stored in a database which may be found, for example, in a HSS or HLR.

Operation 12

The device or user equipment 101 is further configured to determine 12 a priority level or application associated to the information. The processing circuitry 203 is configured to determine the priority level, service or application associated to the information.

Operation 14

The device or user equipment 101 is also configured to make a decision 14 to accept or ignore the paging request based on the priority level, service or application associated with the information. The processing circuitry 203 is configured to make the decision to accept or ignore the paging request based on the priority level, service or application associated with the information.

Example Operation 16

According to some of the example embodiments, the making of the decision 14 may further comprise ignoring 16 the paging request if a value of the priority is lower than an allowed threshold value of if the application is not comprised in an approved listing of applications or services. The processing circuitry 203 may be configured to ignore the paging request if a value of the priority is lower than an allowed threshold value of if the application is not comprised in an approved listing of applications or services.

Example Operation 18

According to some of the example embodiments, the making of the decision 14 may further comprise accepting 18 the paging request if a value of the priority is equal to or higher than an allowed threshold value or if the application is comprised in an approved listing of applications or services. The processing circuitry 203 may be configured to accept the paging request if a value of the priority is equal to or higher than an allowed threshold value or if the application is comprised in an approved listing of applications or services.

Figure 8:
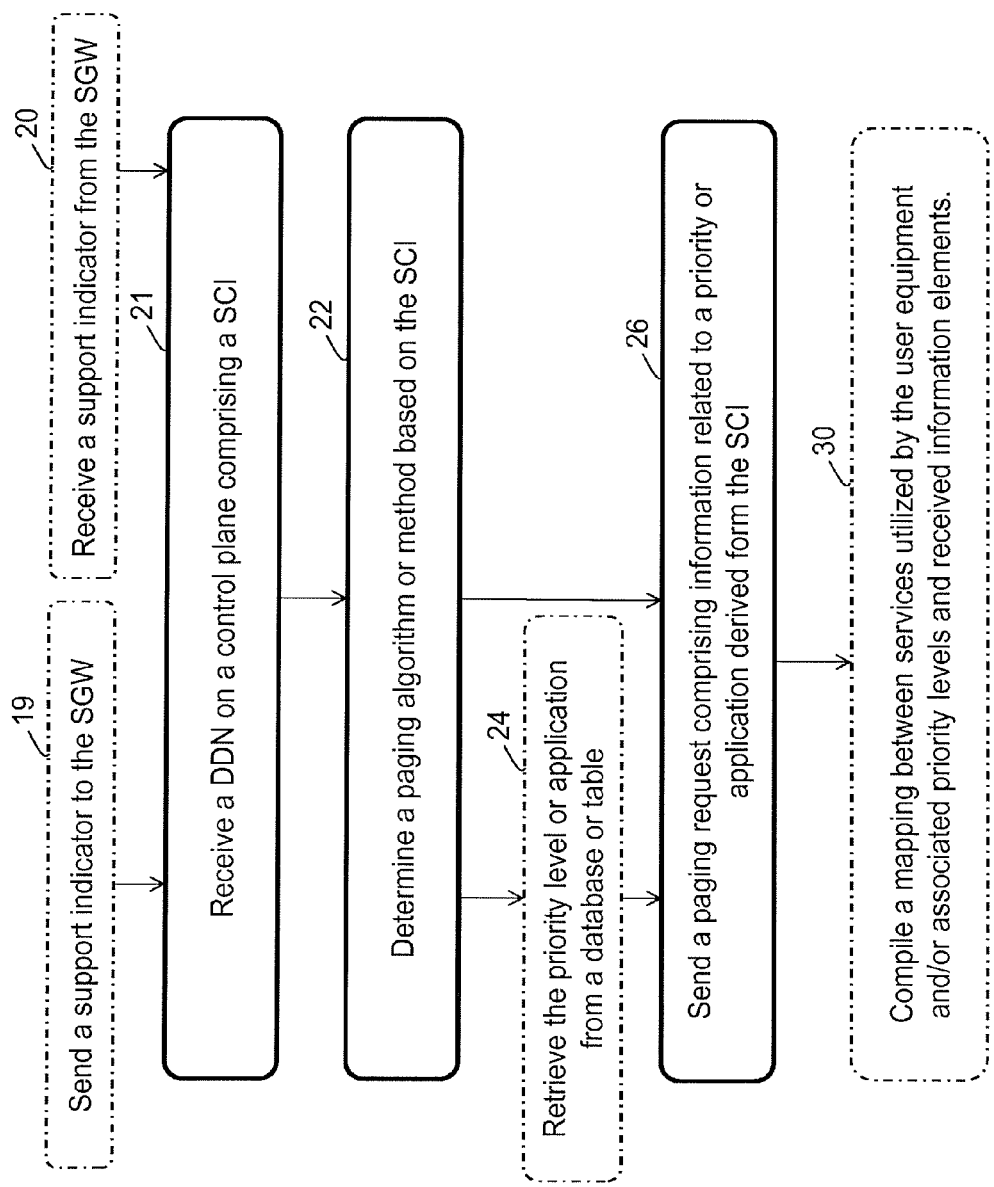
FIG. 8 is a flow diagram depicting example operations which may be taken by the MME or S4-SGSN of FIG. 5, according to some of the example embodiments.

FIG. 8 is a flow diagram depicting example operations which may be taken by the MME 115 or S4-SGSN 110 of FIG. 5 for priority or application based handling of a paging request. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 19

According to some of the example embodiments, the MME or S4-SGSN may be configured to send, to a SGW, a support indicator. The support indication may describe a capability for priority, service or application based paging. The radio circuitry 301 may be configured to send, to the SGW, the support indicator.

Example Operation 20

According to some of the example embodiments, the MME or S4-SGSN may be configured to receive, from the SGW, a support indicator describing a capability of priority, service or application based message passing. The radio circuitry 301 may be configured to receive, from the SGW, the support indicator.

Operation 21

The MME or S4-SGSN is configured to receive 21, from the SGW, a downlink data notification (DDN) on a control plane. The DDN comprises an SCI. The radio circuitry 301 is configured to receive, from the SGW, the DDN.

According to some of the example embodiments the SCI is received via a S4/S11 interface by the MME or S4-SGSN. According to some of the example embodiments the user plane packet is a GTP-U extension header.

Operation 22

The MME or S4-SGSN is also configured to determine 22 a paging algorithm or method based on the SCI. The processing circuitry 303 is configured to determine paging algorithm or method based on the SCI.

Example Operation 24

According to some of the example embodiments, the determining 22 may further comprise retrieving 24 the priority level, service (or type of service) or application from a database or table using the information element as an index. The processing circuitry 303 may be configured to retrieve the priority level, service or application from the database or table using the information element as an index.

According to some of the example embodiments, the database or table may be located within the MME or S4-SGSN, HSS, HLR, and/or the PCRF. It should be appreciated that the database or table may be located in any other node or source in the wireless network which comprises user subscription data.

Operation 26

The MME or S4-SGSN is also configured to send 26, to the device or user equipment, a paging request comprising information related to a priority, service or application derived from the SCI. The radio circuitry 301 is configured to send, to the device or user equipment, the paging request comprising information related to a priority or application derived from the SCI.

According to some of the example embodiments, the sending 26 is performed if the priority level is equal to or higher than an allowable threshold value or if the application or service is an application or service (or type of service) approved for paging.

According to some of the example embodiments, the derived from the SCI information, and comprised in a paging request sent to the device or user equipment, may comprise a specific TMSI used for paging which may be mapped to a priority, service or application identifier. According to some of the example embodiments the information may comprise a new information element which may directly comprise the priority, service or application identifier. According to some of the example embodiments, the priority level, service or application associated with the information may be determined from evaluating the specific TMSI or the priority or application identifier which may be comprised in, or as a part of, the information.

Example Operation 30

According to some of the example embodiments, the MME or S4-SGSN may also be configured to compile 30 a mapping between services utilized by the device or user equipment and received information elements. The processing circuitry 303 may be configured to compile the mapping between services utilized by the device or user equipment and received information elements.

According to some of the example embodiments, such a mapping may be comprised in a table or database. The compiling of such a mapping may be dynamic. According to some of the example embodiments the table or mapping may be provided by an operator, it should also be appreciated that the operator may also provide updates to such a table/database. According to some of the example embodiments, a user may provide updates via a change in subscription.

Figure 9:
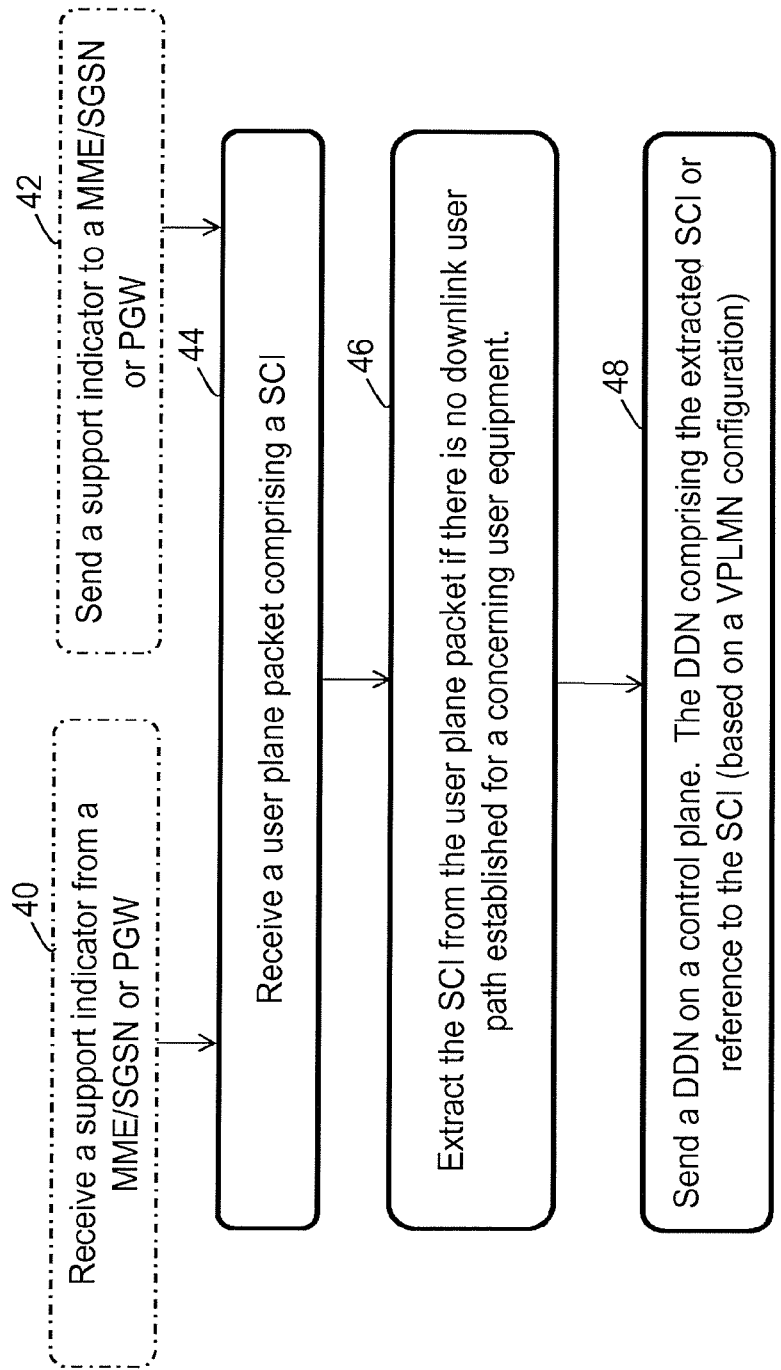
FIG. 9 is a flow diagram depicting example operations which may be taken by the SGW of FIG. 6, according to some of the example embodiments.

FIG. 9 is a flow diagram depicting example operations which may be taken by the SGW of FIG. 6 for priority, service or application based handling of a paging request. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 40

According to some of the example embodiments, the SGW may be configured to receive 40, from a MME or S4-SGSN and/or PGW, a support indicator. The support indicator indicating a capability of priority, service (or type of service) or application based messaging and/or paging. The radio circuitry 401 may be configured to receive the support indicator.

Example Operation 42

According to some of the example embodiments, the SGW may be configured to send 42, from a MME or S4-SGSN and/or PGW, a support indicator. The support indicator indicating a capability of priority, service or application based messaging and/or paging. The radio circuitry 401 may be configured to send the support indicator.

Operation 44

The SGW is configured to receive 44, from a PGW, a user plane packet comprising a SCI. The radio circuitry 401 is configured to receive, from the PGW, the user plane packet comprising the SCI. According to some of the example embodiments, the user plane packet may be or may comprise a GTP-U extension header.

Operation 46

The SGW is also configured to extract the SCI from the user plane packet if there is no downlink user path established for a concerning device or user equipment. The processing circuitry 403 is configured to extract the SCI from the user plane packet if there is no downlink user path established for a concerning device or user equipment.

Operation 48

The SGW is further configured to send, to the MME or S4-SGSN, a downlink data notification message on a control plane. The downlink data notification comprises the SCI or reference to the SCI (based on a VPLMN configuration). The radio circuitry 401 is configured to send, to the MME or S4-SGSN, the downlink data notification on the control plane.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should be appreciated that the term user equipment and device may be used interchangeable. Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a Serving Gateway (SGW), for handling priority, service or application based paging, the SGW being comprised in a wireless communications network, the method comprising:
   the SGW receiving, from a Packet Data Network Gateway (PGW), a user plane packet for a user equipment (UE), the user plane packet comprising a Service Class Indicator (SCI);
   the SGW receiving, from a mobility management node (MMN), a support indicator indicating whether the MMN supports handling or paging based on SCI information;
   the SGW determining that a condition is true, wherein determining that the condition is true comprises determining that the support indicator indicates that the MMN supports handling or paging based on SCI information; and
   in response to determining that the condition is true;
   the SGW sending, to the MMN, a downlink data notification message on a control plane, said downlink data notification comprising the received SCI or a reference to the SCI, wherein
   the MMN is one of: a Mobility Management Entity (MME) and a Serving General Packet Radio Service Support Node (SGSN).

2. The method of claim 1, wherein the user plane packet comprises a General Packet Radio Service Tunnelling Protocol-User Plane (GTP-U) extension header.

3. The method of claim 1, wherein the support indicator indicates a capability of priority, service or application based messaging and/or paging.

4. The method of claim 1, wherein
   determining whether the condition is true further comprises determining whether the UE is in an idle state, and
   the SGW sends the downlink data notification message to the MMN as a result of determining that the UE is in the idle state and the support indicator indicates that the MMN supports handling or paging based on SCI information.

5. A Serving Gateway (SGW) for handling priority, service or application based paging, the SGW being comprised in a wireless communications network, the SGW being adapted to:
   receive, from a mobility management node (MMN), a support indicator indicating whether the MMN supports handling or paging based on Service Class Indicator (SCI) information;
   receive, from a Packet Data Network Gateway (PGW), a user plane packet comprising an SCI;
   determine that a condition is true, wherein determining that the condition is true comprises determining that the support indicator indicates that the MMN supports handling or paging based on SCI information; and
   in response to determining that the condition is true, send, to the MMN, a downlink data notification message on a control plane, said downlink data notification comprising the received SCI or a reference to the received SCI, wherein
   the MMN is one of: a Mobility Management Entity (MME) and a Serving General Packet Radio Service Support Node (SGSN).

6. The SGW of claim 5, wherein the user plane packet comprises a General Packet Radio Service Tunnelling Protocol-User Plane (GTP-U) extension header.

7. The SGW of claim 5, wherein the support indicator indicates a capability of priority, service or application based messaging and/or paging.

8. The SGW of claim 5, wherein
   the SGW is further configured to determine whether the UE is in an idle state, and
   the SGW is configured to send the downlink data notification message to the MMN only if the SGW determines that the UE is in the idle state and the support indicator indicates that the MMN supports handling or paging based on SCI information.

* * * * *

UNITED STATES PATENT AND TRADEMARK OFFICE
CERTIFICATE OF CORRECTION

PATENT NO. : 9,674,816 B2
APPLICATION NO. : 14/560706
DATED : June 6, 2017
INVENTOR(S) : Yang et al.

It is certified that error appears in the above-identified patent and that said Letters Patent is hereby corrected as shown below:

In the Drawings

In Fig. 8, Sheet 8 of 9, for Step "26", in Line 2, delete "form" and insert -- from --, therefor.

In the Specification

In Column 3, Line 39, delete "GSM/EDGE" and insert -- GSM EDGE --, therefor.

In Column 5, Line 2, delete "Node" and insert -- Node (GGSN) --, therefor.

In Column 6, Line 13, delete "S4-SGSSN" and insert -- S4-SGSN --, therefor.

In Column 7, Line 14, delete "M-TMSI" and insert -- P-TMSI --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*